(12) United States Patent
Lee et al.

(10) Patent No.: US 10,661,521 B2
(45) Date of Patent: May 26, 2020

(54) RESIDUAL LOAD RELIEF SYSTEM FOR HYDRAULIC COMPACTORS HAVING ROTARY PUMPS

(71) Applicants: Anatoly D. Lee, Jacksonville, FL (US); Kim Kawasaki, Jacksonville, FL (US)

(72) Inventors: Anatoly D. Lee, Jacksonville, FL (US); Kim Kawasaki, Jacksonville, FL (US)

(*) Notice: Subject to any disclaimer, the term of this patent is extended or adjusted under 35 U.S.C. 154(b) by 297 days.

(21) Appl. No.: 15/887,765

(22) Filed: Feb. 2, 2018

(65) Prior Publication Data
US 2018/0215116 A1  Aug. 2, 2018

Related U.S. Application Data

(60) Provisional application No. 62/453,573, filed on Feb. 2, 2017.

(51) Int. Cl.
| F16K 15/18 | (2006.01) |
| B30B 15/18 | (2006.01) |
| F15B 7/00  | (2006.01) |

(52) U.S. Cl.
CPC .......... B30B 15/18 (2013.01); B30B 15/186 (2013.01); F15B 7/006 (2013.01); F16K 15/18 (2013.01); *F15B 2211/20561* (2013.01); *F15B 2211/27* (2013.01); *F15B 2211/30505* (2013.01); *F15B 2211/31529* (2013.01); *F15B 2211/329* (2013.01); *F15B 2211/41581* (2013.01); *F15B 2211/428* (2013.01); *F15B 2211/476* (2013.01); *F15B 2211/50518* (2013.01); *F15B 2211/5159* (2013.01); *F15B 2211/55* (2013.01); *F15B 2211/611* (2013.01); *F15B 2211/613* (2013.01); *F15B 2211/615* (2013.01); *F15B 2211/7053* (2013.01); *F15B 2211/851* (2013.01); *F15B 2211/853* (2013.01); *F15B 2211/86* (2013.01); *F15B 2211/865* (2013.01); *F15B 2211/8633* (2013.01)

(58) Field of Classification Search
CPC .... F15B 2211/20561; F15B 2211/3051; F15B 7/006; F15B 2211/55; F15B 2211/30505; F15B 2211/50518; F15B 2211/476; F15B 2211/5159; F15B 2211/329; F15B 2211/785; F15B 2211/27; F15B 2211/50536; B30B 15/186; B30B 15/18; F16K 15/18

See application file for complete search history.

(56) References Cited

U.S. PATENT DOCUMENTS

| 3,903,698 | A  * | 9/1975 | Gellatly | .................. F16H 39/02 60/453 |
| 6,886,332 | B2 * | 5/2005 | Kubinski | ................ F15B 7/006 60/475 |

(Continued)

*Primary Examiner* — Abiy Teka
(74) *Attorney, Agent, or Firm* — Thomas C. Saitta

(57) ABSTRACT

An automatic residual load relief system for hydraulic compactors having rotary pumps relieves residual load inherent in the compacted material by releasing hydraulic fluid from the cylinder prior to reversal of the rotary pump while preventing the fluid from returning to the pump. The system comprises in general a rotary pump powered by a motor, one-way suction check valves, a flow check valve, a one-way, normally-open, pilot operated check valve, a cylinder comprising a reciprocating piston, the piston defining a disk void and an annular void within the cylinder, and a tank.

9 Claims, 2 Drawing Sheets

(56) References Cited

U.S. PATENT DOCUMENTS

| | | | |
|---|---|---|---|
| 8,997,473 B2 * | 4/2015 | Olson | F15B 7/006 |
| | | | 60/329 |
| 8,997,626 B2 * | 4/2015 | Anderson | F15B 15/18 |
| | | | 91/437 |
| 10,041,515 B2 * | 8/2018 | Fu | F04B 53/16 |

* cited by examiner

RESIDUAL LOAD RELIEF SYSTEM FOR HYDRAULIC COMPACTORS HAVING ROTARY PUMPS

BACKGROUND OF THE INVENTION

This application relates generally to the field of hydraulic compactors and more particularly relates to such compactors having reversible rotary pumps for the distribution of hydraulic fluid, the pumps changing the direction of rotation (clockwise/counter-clockwise) to change the direction of movement (extension/retraction) of the piston of a hydraulic compacting cylinder.

Hydraulic compacting systems, i.e., equipment that compresses material, often consisting of a plurality of objects (e.g., trash, cardboard boxes, etc.), into a compacted bundle for easier handling, transport, storage, etc., are well known. In basic form, a hydraulic system operates a cylinder having a reciprocating piston that extends to compress the material and retracts to release the material, the compaction stroke being a high-pressure stroke and the retraction stroke being a low-pressure stroke. Many hydraulic compacting systems utilize a rotary hydraulic pump, wherein rotation in one direction initiates the compaction stroke and rotation in the opposite direction initiates the retraction stroke.

In many compacting situations, when the piston is fully extended in the compaction stroke, the compacted material retains an elastic or residual load that pushes against the piston in the retraction direction. For systems having rotary hydraulic pumps, the force from this residual load can damage the rotary pump, since in operation the pump must reverse the direction of rotation to change the flow direction of the hydraulic fluid. It is an object of this invention to provide a relief system that prevents damage to the rotary pump from the stresses imparted by the residual load of the compacted material.

SUMMARY OF THE INVENTION

Figure 1:
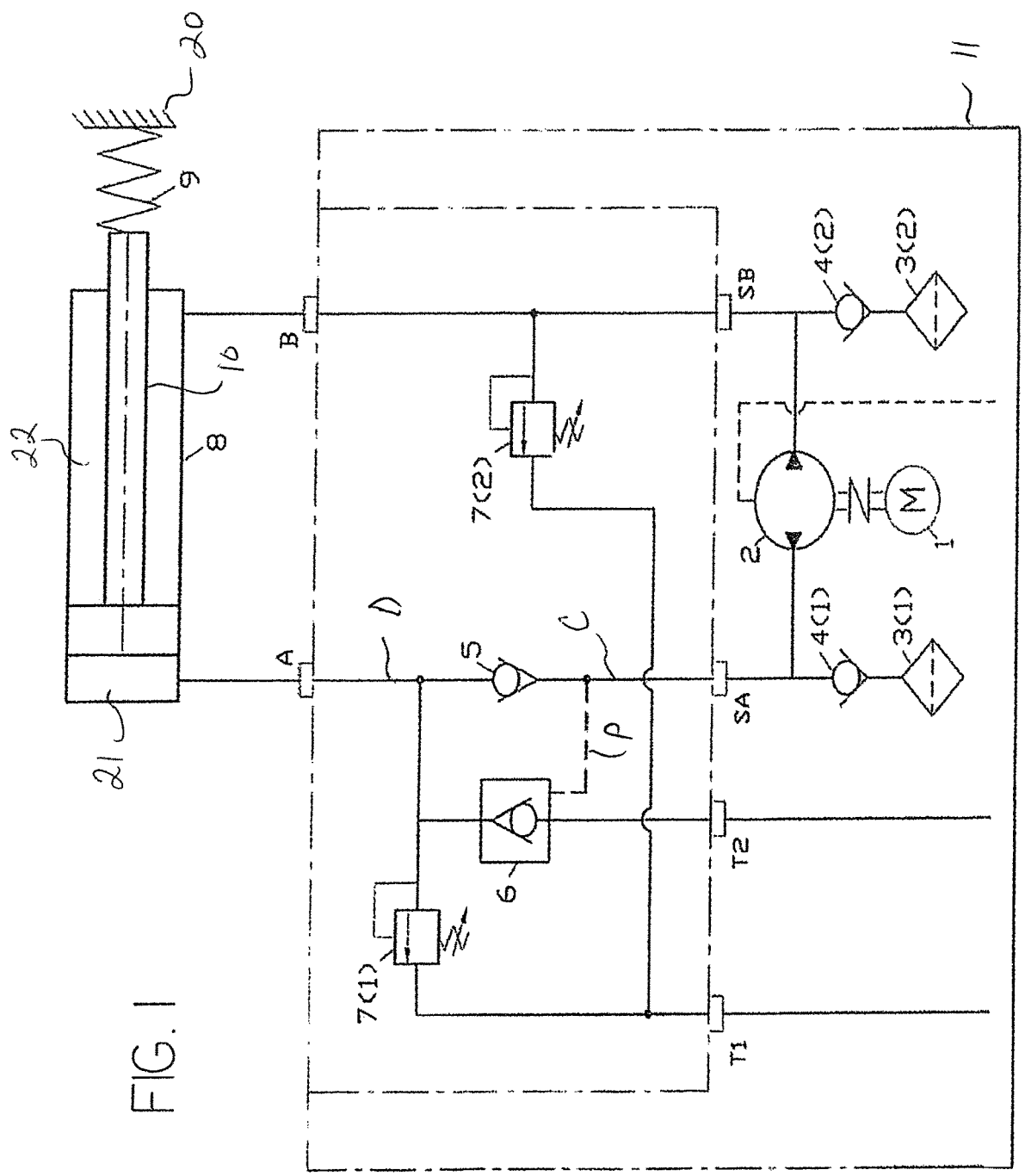
FIG. 1 is a schematic diagram of a first embodiment of the residual load relief system.

An automatic residual load relief system for hydraulic compactors having rotary pumps operating hydraulic compaction cylinders is disclosed, the relief system being a system that relieves residual load, elastic load or back pressure created during compaction by releasing or bleeding hydraulic fluid from the hydraulic cylinder prior to reversal of the rotary pump. The system comprises in general a rotary pump powered by a motor, one-way suction check valves, a flow check valve, a one-way, normally-open, pilot operated check valve, a cylinder comprising a reciprocating piston, the piston defining a disk void and an annular void within the cylinder, and a tank or reservoir.

The flow check valve is disposed in a fluid conduit segment such that hydraulic fluid passes through the conduit segment and check valve to a compacting cylinder during the compaction stroke. The flow check valve precludes fluid from passing into the conduit segment in the reverse direction during the retraction stroke, instead diverting the fluid to the pilot operated check valve. During the compaction stroke, the normally-open, pilot operated check valve is maintained in the closed position by pressure within the conduit segment. When there is low pressure in the conduit segment, such as occurs during the retraction stroke, the pilot operated check valve opens such that hydraulic fluid from the cylinder may pass through and be returned to the tank rather than impacting the rotary pump.

At the end of a compaction stroke, the material being compacted possesses a residual load (also known as an elastic load or back pressure) that forces the piston back into the cylinder. If the residual load forces hydraulic fluid into the rotary pump prior to its directional rotation being reversed, the pump or motor may be damaged. The combination of the flow check valve and pilot operated check valve automatically diverts fluid movement caused by the residual load away from the rotary pump or motor and into the tank, thereby preventing damage to the rotary pump or motor.

Alternatively expressed, the invention is a hydraulic compactor automatic residual load relief system comprising:
12509
the combination of a rotary pump powered by a motor, first and second one-way suction check valves, a one-way flow check valve, a one-way, normally-open, pilot operated check valve, a cylinder comprising a reciprocating piston, the piston defining a disk void and an annular void within the cylinder, first and second cylinder ports, first and second supply ports, first and second tank return ports, and a tank, all connected in fluid communication by conduits, with a first conduit segment extending between the first supply port and the one-way flow check valve and a second conduit segment extending between the one-way flow check valve and the first supply port, and with the one-way, normally-open, pilot operated check valve in operational communication through a pilot line with the first conduit segment and in fluid communication with the second conduit segment;

whereby during a compaction stroke the motor rotates the rotary pump in a first direction such that hydraulic fluid, comprising fluid returned from the annular void of the cylinder and fluid drawn as needed from tank through the second suction check valve, passes through the first supply port, the first conduit segment, the flow check valve, the second conduit segment and the first cylinder port into the disk void of the cylinder;

whereby the normally-open pilot operated check valve in communication with the first conduit segment through the pilot line is closed in response to the pressurized flow in the first conduit segment creating sufficient pressure in the pilot line to maintain the pilot operated check valve in the closed position, thereby preventing fluid delivered from the pump through the flow check valve from being returned to the tank through the pilot operated valve;

and further whereby upon cessation of the compaction stroke and during a retraction stroke the motor rotates the pump in the opposite direction from the rotation of the compaction stroke, such that fluid drawn from the tank through the first suction check valve is forced through the second supply port and second cylinder port into the annular void of the cylinder:

whereby the fluid forced from the cylinder disk void by the retracting piston passes through the first cylinder port into the second conduit segment and is diverted by the one-way flow check valve to the pilot operated check valve, which is in fluid communication with the second conduit segment, said pilot operated check valve now being open as there is now low pressure in the first conduit segment, such that the hydraulic fluid dispelled from the cylinder disk void is returned to the tank through second tank return port and is precluded from passing into the rotary pump.

DETAILED DESCRIPTION OF THE INVENTION

In general, the invention is a residual load relief system for hydraulic compactors having rotary pumps, i.e., a relief system that relieves residual load, elastic load or back pressure by releasing or bleeding hydraulic fluid from the cylinder prior to reversal of the rotary pump. With reference to the drawings, the hydraulic compacting system or equipment comprises in general a rotary pump 2 powered by a motor 1, first and second one-way suction check valves 4(1) and 4(2), a one-way flow check valve 5, a one-way, normally-open, pilot operated check valve 6, a cylinder 8 comprising a reciprocating piston 10, the piston 10 defining a disk void 21 and an annular void 22 within the cylinder 8, and a tank or reservoir 11. In addition, the system comprises first and second strainers 3(1) and 3(2), first and second pressure relief valves 7(1) and 7(2), first and second cylinder ports A and B, first and second supply ports SA and SB, and first and second tank return ports T(1) and T(2). These elements are connected in fluid communication such that hydraulic fluid passes through conduits to and from the elements in differing pathways depending on the operational function occurring at any given time. A first conduit segment C is disposed between first supply port SA and one-way flow check valve 5, and a second conduit segment D is disposed between one-way flow check valve 5 and first cylinder port A.

For the compaction stroke, in which the piston 10 is extended and force is applied to the material 20 to be compacted, the motor 1 rotates the pump 2 in a first direction such that hydraulic fluid, comprising fluid returned from the annular void 22 of the cylinder 8 and fluid drawn as needed from tank 11 through second strainer 3(2) and second suction check valve 4(2), is passed through first supply port SA, conduit segment C, flow check valve 5, conduit segment D and first cylinder port A into the disk void 21 of the cylinder 8. First suction check valve 4(1) prevents fluid delivered from pump 2 from flowing directly into tank 11. The normally-open pilot operated check valve 6 is in communication with conduit segment C through pilot line P, situated upstream of the flow check valve 5. Because of the flow pressure created by the pump 2, the high pressure in the conduit segment C upstream of the flow check valve 5 (i.e., the portion of the conduit situated between flow check valve 5 and first supply port SA) creates pressure in pilot line P which maintains the pilot operated check valve 6 in the closed position, thereby preventing fluid delivered from pump 2 through the flow check valve 5 from being returned to tank 11 through pilot operated valve 6. As the piston 10 is extended to compact the material 20, fluid from the cylinder annular void 22 flows through second cylinder port B and second supply port SB and into pump 2. Second suction check valve 4(2) prevents fluid flow from the cylinder annular void 22 into tank 11.

For the retraction stroke, in which the piston 10 is retracted away from the material 20 and moves into the interior of cylinder 8, motor 1 rotates pump 2 in the opposite direction from the rotation of the compaction stroke. Fluid drawn from tank 11 through first strainer 3(1) and first suction check valve 4(1) is forced through second supply port SB and second cylinder port B into the annular void 22 of cylinder 8. Second suction check valve 4(2) prevents fluid from the pump 2 from returning to tank 11. Fluid forced from the cylinder disk void 21 by the retracting piston 10 passes through first cylinder port A into conduit segment D (the segment between first cylinder port A and flow check valve 5, i.e., the segment downstream of check valve 5 during the compaction stroke) and is diverted by flow check valve 5 to pilot operated check valve 6, which is in fluid communication with conduit segment D. Since there is now no fluid flow from pump 2 into conduit segment C, the flow pressure in conduit segment C between flow check valve 5 and first supply port SA is below the threshold for automatic opening of the pilot operated check valve 6. The pilot operated check valve 6 is no longer prevented from opening, such that the pilot operated check valve 6 automatically switches to the open position and the hydraulic fluid dispelled from the cylinder disk void 21 is returned to the tank 11 through second tank return port T(2).

Upon cessation of the compaction stroke, the elastic or residual load 9 present in the compacted material 20 exerts back pressure against the piston 10 prior to the rotational direction of the pump 2 being reversed in order to retract the piston 10. The pump 2 may be stopped for about 1 to 1.5 seconds during rotation reversal. Should fluid be forced back into the pump 2 at this time, the pump 2 and/or motor 1 may be damaged. This cannot happen since the flow check valve 5 and pilot operated valve 6 act in tandem to automatically divert fluid flow away from the pump 2 as soon as the pressure level in conduit segment C falls below a threshold level. i.e., as soon as the rotation of the pump 2 in the compaction direction is stopped. Flow check valve 5 prevents fluid from entering conduit segment C from the cylinder disk void 21, and since there is no flow from pump 2 entering conduit segment C from first supply conduit SA, there is sufficiently low pressure in conduit segment C and pilot line P that allows the pilot operated check valve 6 to open. In this manner, the residual load pressure is relieved by allowing fluid to pass from the cylinder disk void 21 through first supply port A, pilot operated check valve 6 and first tank return port T(1) into tank 11.

In the event that excessive pressure is encountered in the system on the compaction or retraction strokes, pressure relief valves 7(1) and/or 7(2) will open to deliver fluid into the tank 11 through return port T(1).

Figure 2:
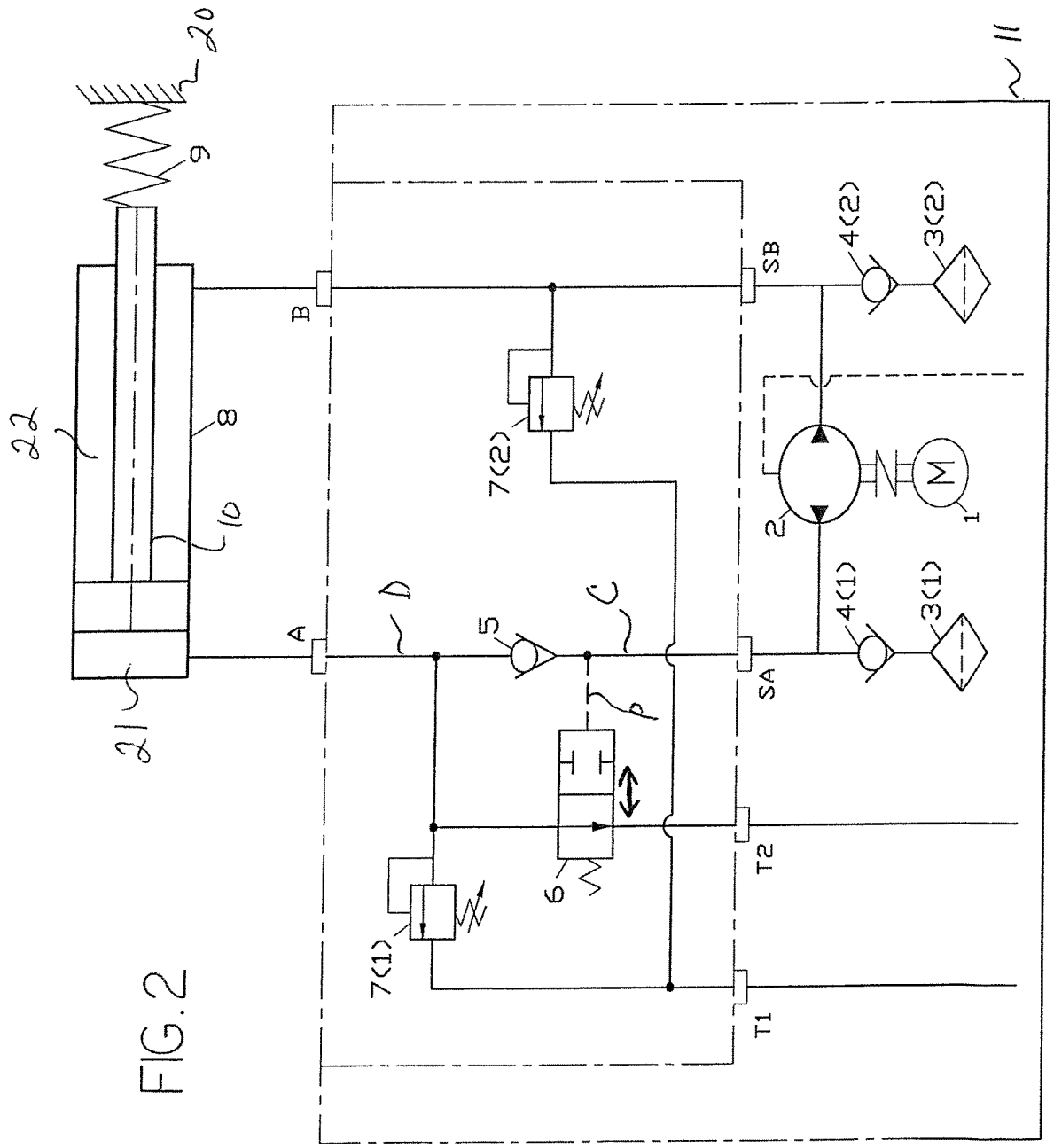
FIG. 2 is a schematic diagram of a second embodiment of the residual load relief system.

FIGS. 1 and 2 illustrate alternate embodiments for the one-way, normally-open, pilot operated check valve 6. In FIG. 1 the pilot operated check valve 6 is a poppet-type valve. When there is low pressure in the pilot line P, the pilot operated check valve 6 is in the open position and fluid can flow from the cylinder disk void 21 of cylinder 8 through conduit segment D, pilot operated check valve 6 and then into tank 11. When there is sufficiently high pressure in the pilot line P, which occurs during the compaction stroke, the check poppet is seated and blocks flow of fluid through the pilot operated check valve 6. In FIG. 2, the pilot operated check valve 6 is a sliding two-way, two position valve. As before, with sufficiently high pressure in the pilot line P, the pilot operated check valve 6 remains closed. The pilot operated check valve 6 opens when the pressure is sufficiently low in pilot line P. Other types of normally-open pilot operated check valves may also be substituted.

It is understood that equivalents and substitutions for elements set forth above may be obvious to those of skill in the art, and therefore the true scope and definition of the invention is to be as set forth in the following claims.

The invention claimed is:

1. A hydraulic compactor automatic residual load relief system comprising:

the combination of a rotary pump powered by a motor, first and second one-way suction check valves, a one-way flow check valve, a one-way, normally-open, pilot operated check valve, a cylinder comprising a reciprocating piston, the piston defining a disk void and an annular void within the cylinder, first and second cylinder ports, first and second supply ports, first and second tank return ports, and a tank, all connected in fluid communication by conduits, with a first conduit segment extending between the first supply port and the one-way flow check valve and a second conduit segment extending between the one-way flow check valve and the first cylinder port, and with the one-way, normally-open, pilot operated check valve in operational communication through a pilot line with the first conduit segment and in fluid communication with the second conduit segment;

whereby during a compaction stroke the motor rotates the rotary pump in a first direction such that hydraulic fluid, comprising fluid returned from the annular void of the cylinder and fluid drawn as needed from tank through the second suction check valve, passes through the first supply port, the first conduit segment, the flow check valve, the second conduit segment and the first cylinder port into the disk void of the cylinder;

whereby the normally-open pilot operated check valve in communication with the first conduit segment through the pilot line is closed in response to the pressurized flow in the first conduit segment creating sufficient pressure in the pilot line to maintain the pilot operated check valve in the closed position, thereby preventing fluid delivered from the pump through the flow check valve from being returned to the tank through the pilot operated valve;

and further whereby upon cessation of the compaction stroke and during a retraction stroke the motor rotates the pump in the opposite direction from the rotation of the compaction stroke, such that fluid drawn from the tank through the first suction check valve is forced through the second supply port and second cylinder port into the annular void of the cylinder:

whereby the fluid forced from the cylinder disk void by the retracting piston passes through the first cylinder port into the second conduit segment and is diverted by the one-way flow check valve to the pilot operated check valve, which is in fluid communication with the second conduit segment, said pilot operated check valve now being open as there is now low pressure in the first conduit segment, such that the hydraulic fluid dispelled from the cylinder disk void is returned to the tank through second tank return port and is precluded from passing into the rotary pump.

2. The system of claim 1, wherein the pilot operated check valve is a poppet-type valve.

3. The system of claim 1, wherein the pilot operated check valve is a sliding two-way, two position valve.

4. The system of claim 1, further comprising a first pressure relief valve in fluid communication with the disk void and a second pressure relief valve in fluid communication with the annular void, both the first and second pressure relief valves in fluid communication with the tank, whereby excessive pressure within the system during either the compaction stroke or the retraction stroke is relieved by delivering hydraulic fluid to the tank through the first or second pressure relief valves.

5. A hydraulic compactor automatic residual load relief system comprising:

the combination of a rotary pump powered by a motor, a one-way flow check valve, a one-way, normally-open, pilot operated check valve, a cylinder comprising a reciprocating piston, a disk void and an annular void, and a tank, all connected in fluid communication by conduits, with a first conduit segment extending between the pump and the one-way flow check valve and a second conduit segment extending between the one-way flow check valve and the disk void;

the pilot operated check valve in fluid communication with the second conduit segment, and further comprising a pilot line controlling the pilot operated check valve in fluid communication with the first conduit segment, whereby pressurized flow of hydraulic fluid from the pump to the disk void of the cylinder maintains the pilot operated check valve in a closed position;

the reciprocating piston of the cylinder having a compaction stroke and a retraction stroke, whereby during the compaction stroke the motor rotates the rotary pump in a first direction such that hydraulic fluid passes through the first conduit segment, the flow check valve, the second conduit segment and into the disk void of the cylinder;

and further whereby upon cessation of the compaction stroke and during a retraction stroke the motor rotates the pump in the opposite direction from the rotation of the compaction stroke, such that hydraulic fluid is forced into the annular void of the cylinder and the pressure within the first conduit segment is reduced such that the pilot operated check valve opens;

whereby the hydraulic fluid forced from the cylinder disk void by the retracting piston passes into the second conduit segment and is diverted by the one-way flow check valve through the pilot operated check valve to the tank and is precluded from passing into the rotary pump.

6. The system of claim 5, wherein the pilot operated check valve is a poppet-type valve.

7. The system of claim 5, wherein the pilot operated check valve is a sliding two-way, two position valve.

8. The system of claim 5, further comprising first and second one-way suction check valves, whereby during the compaction stroke hydraulic fluid is supplied to the rotary pump from the annular void of the cylinder and drawn as needed from tank through the second suction check valve, and whereby during the retraction stroke hydraulic fluid is supplied to the rotary from the tank through the first suction check valve.

9. The system of claim 8, further comprising a first pressure relief valve in fluid communication with the disk void and a second pressure relief valve in fluid communication with the annular void, both the first and second pressure relief valves in fluid communication with the tank, whereby excessive pressure within the system during either the compaction stroke or the retraction stroke is relieved by delivering hydraulic fluid to the tank through the first or second pressure relief valves.

\* \* \* \* \*